United States Patent
Li

(10) Patent No.: US 9,846,563 B2
(45) Date of Patent: Dec. 19, 2017

(54) METHOD, MOBILE TERMINAL AND SYSTEM FOR IMPLEMENTING MULTIMEDIA PLAYING

(71) Applicant: ZTE Corporation, Shenzhen, Guangdong (CN)

(72) Inventor: Kunning Li, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/437,950

(22) PCT Filed: Aug. 9, 2013

(86) PCT No.: PCT/CN2013/081227
§ 371 (c)(1),
(2) Date: Apr. 23, 2015

(87) PCT Pub. No.: WO2014/063515
PCT Pub. Date: May 1, 2014

(65) Prior Publication Data
US 2015/0301780 A1  Oct. 22, 2015

(30) Foreign Application Priority Data

Oct. 23, 2012  (CN) .......................... 2012 1 0407314

(51) Int. Cl.
*G06F 3/14* (2006.01)
*H04N 21/8547* (2011.01)
(Continued)

(52) U.S. Cl.
CPC .......... *G06F 3/1446* (2013.01); *H04L 65/607* (2013.01); *H04N 21/4122* (2013.01);
(Continued)

(58) Field of Classification Search
CPC ........ H04N 7/16; H04N 11/02; G06F 3/1146; G06F 3/014
See application file for complete search history.

(56) References Cited

U.S. PATENT DOCUMENTS

2004/0048570 A1  3/2004  Oba
2005/0286546 A1  12/2005  Bassoli
(Continued)

FOREIGN PATENT DOCUMENTS

CN  101202568 A  6/2008
CN  101459724 A  6/2009
(Continued)

OTHER PUBLICATIONS

International Search Report in international application No. PCT/CN2013/081227, dated Nov. 7, 2013.
(Continued)

*Primary Examiner* — Tony N Ngo
(74) *Attorney, Agent, or Firm* — Oppedahl Patent Law Firm LLC

(57) ABSTRACT

A method, system and mobile terminal for implementing multimedia playing are described, which includes that a mobile terminal sends multimedia stream data to be played to another-end mobile terminal via a connection established based on NFC technology, and the mobile terminal and the another-end mobile terminal decode the multimedia stream data to be played, and respectively play corresponding parts of the decoded multimedia stream data in accordance with the respective part playing mode. In this way, two mobile terminals can respectively playing part of a multimedia image based on NFC technology, a multimedia image can be clearly amplified and displayed via the splicing of mobile terminal screens, thereby helping a user quickly solve the
(Continued)

problem that a mobile terminal screen is small and not good for amplifying and displaying the multimedia image.

10 Claims, 2 Drawing Sheets

(51) Int. Cl.
    *H04N 21/41*     (2011.01)
    *H04N 21/414*     (2011.01)
    *H04N 21/43*     (2011.01)
    *H04N 21/431*     (2011.01)
    *H04N 21/4363*     (2011.01)
    *H04W 4/00*     (2009.01)
    *H04L 29/06*     (2006.01)
    *H04N 19/44*     (2014.01)
    *H04N 21/485*     (2011.01)

(52) U.S. Cl.
    CPC ... *H04N 21/4126* (2013.01); *H04N 21/41407* (2013.01); *H04N 21/4307* (2013.01); *H04N 21/4318* (2013.01); *H04N 21/43637* (2013.01); *H04N 21/8547* (2013.01); *H04W 4/008* (2013.01); *G09G 2300/026* (2013.01); *G09G 2340/145* (2013.01); *H04N 19/44* (2014.11); *H04N 21/4858* (2013.01)

(56) References Cited

U.S. PATENT DOCUMENTS

| | | | |
|---|---|---|---|
| 2008/0216125 A1* | 9/2008 | Li | H04N 13/0239 725/62 |
| 2009/0264176 A1 | 10/2009 | Walker | |
| 2010/0144283 A1 | 6/2010 | Curcio | |
| 2011/0221657 A1* | 9/2011 | Haddick | G02B 27/017 345/8 |
| 2012/0258781 A1 | 10/2012 | Walker | |
| 2014/0285416 A1* | 9/2014 | Priyantha | H04B 5/0037 345/156 |

FOREIGN PATENT DOCUMENTS

| | | |
|---|---|---|
| CN | 101568028 A | 10/2009 |
| CN | 101587431 A | 11/2009 |
| CN | 101674364 A | 3/2010 |
| CN | 101969460 A | 2/2011 |
| CN | 102222493 A | 10/2011 |
| CN | 101568028 B | 11/2011 |
| WO | 2004021711 A1 | 3/2004 |

OTHER PUBLICATIONS

English Translation of the Written Opinion of the International Search Authority in international application No. PCT/CN2013/081227, dated Nov. 7, 2013.

Supplementary European Search Report in European application No. 13849384.6, dated Jun. 25, 2015.

* cited by examiner

METHOD, MOBILE TERMINAL AND SYSTEM FOR IMPLEMENTING MULTIMEDIA PLAYING

TECHNICAL FIELD

The disclosure relates to the field of wireless communications, and particularly to a method, mobile terminal and system for implementing multimedia playing.

BACKGROUND

Light Emitting Diode (LED) electronic display screens on the market are made according to a principle that diodes have a common anode, and when a certain row of diodes are connected to a high level while a certain column of diodes are connected to a low level, the diodes in the row and the column crossed with each other will be lightened. A design principle of larger display screens is that digital pins corresponding to horizontal modules are connected through wired connection of circuits, letter pins corresponding to vertical modules are connected, and each row of modules (two modules in vertical direction) may be scanned dynamically under the control of a chip and lightened cyclically.

However, such physical screen enlargement cannot be applied to enlargement of mobile terminal screens because of the following reasons:

one of the most important features of mobile terminals is that mobile terminals are portable so as to connect with network anytime and anywhere conveniently, that is why mobile terminal screens cannot be too large. However, smaller mobile terminal screens are not good for viewing multimedia images, and there is a very restrictive space limitation to the conventional amplifying and displaying method of connecting a mobile terminal to a large screen by wire.

SUMMARY

In view of the problem above, embodiments of the disclosure propose a method, mobile terminal and system for implementing multimedia playing to solve the problem that existing mobile terminal screens are too small to display multimedia images.

To realize the purpose above, the following technical solution is applied by the embodiments of the disclosure.

An embodiment of the disclosure provides a method for implementing multimedia playing. The method includes that a local mobile terminal sends multimedia stream data to be played to another-end mobile terminal via a connection established based on Near Field Communication (NFC) technology, and that the local mobile terminal and the another-end mobile terminal decode the multimedia stream data to be played, and respectively play corresponding parts of the decoded multimedia stream data in accordance with their respective part playing modes.

In the solution above, before the multimedia stream data to be played is sent, the method may further include that the local mobile terminal and the another-end mobile terminal establish the connection through the NFC technology.

In the solution above, before the multimedia stream data to be played is sent, the method may further include the local mobile terminals set their respective part playing modes according to user input.

In the solution above, the method may further include that the local mobile terminal and the another-end mobile terminal achieve multimedia playing synchronization according to a synchronization mechanism.

In the solution above, the step that the local mobile terminal and the another-end mobile terminal achieve multimedia playing synchronization according to the synchronization mechanism may include that:

a time label of multimedia stream data currently played by the another-end mobile terminal is received, a time label of multimedia stream data currently played by the local mobile terminal is acquired, the two time labels are compared to determine whether a time difference exists, and if the time difference exists, playing time calibration is performed on multimedia stream data played by the local mobile terminal; or a time label of multimedia stream data currently played by the local mobile terminal is received, a time label of multimedia stream data currently played by the another-end mobile terminal is acquired, the two time labels are compared to determine whether a time difference exists, and if the time difference exists, playing time calibration is performed on multimedia stream data played by the another-end mobile terminal.

An embodiment of the disclosure further provides a system for implementing multimedia playing, wherein the system includes a local mobile terminal and another-end mobile terminal, wherein the local mobile terminal is configured to send multimedia stream data to be played to the another-end mobile terminal, decode the multimedia stream data to be played and play a corresponding part of the decoded multimedia stream data in accordance with a part playing mode set by the local mobile terminal;

the another-end mobile terminal is configured to receive multimedia stream data sent by the local mobile terminal, decode the received multimedia stream data and play a corresponding part of the decoded multimedia stream data in accordance with a part playing mode set by the another-end mobile terminal.

The local mobile terminal may be further configured to set its own part playing mode according to user input;

the another-end mobile terminal may be further configured to set its own part playing mode according to user input.

When the local mobile terminal implements a synchronous playing mechanism, the local mobile terminal may be further configured to achieve multimedia playing synchronization with the another-end mobile terminal based on a synchronization mechanism; or when the another-end mobile terminal implements a synchronous playing mechanism, the another-end mobile terminal may be further configured to achieve multimedia playing synchronization with the local mobile terminal based on a synchronization mechanism.

In the solution above, the local mobile terminal may include a decoding module and a playing module, wherein the decoding module is configured to decode multimedia stream data to be played; and the playing module is configured to play a corresponding decoded part of the multimedia stream data in accordance with the part playing mode set by the local mobile terminal.

In the solution above, the local mobile terminal may further include a setting module, configured to set the part playing mode of the local mobile terminal according to user input.

In the solution above, the local mobile terminal may further include:

a sending module, configured to send multimedia stream data to be played to the another-end mobile terminal; or a receiving module, configured to receive to-be-played multimedia stream data sent by the another-end mobile terminal.

In the solution above, the local mobile terminal may further include:

a synchronization module, configured to achieve multimedia playing synchronization with the another-end mobile terminal according to a synchronization mechanism.

In the solution above, the synchronization module may include a monitoring and management module and a time management module, wherein the monitoring and management module is configured to receive a time label of multimedia stream data currently played by the mobile terminal, acquire a time label of multimedia stream data currently played by the another-end mobile terminal, compare the two time labels to determine whether a time difference exists, and if the time difference exists, trigger a time management module to perform playing time calibration on multimedia stream data played by the local mobile terminal; and the time management module is configured to perform playing time calibration on the multimedia stream data played by the local mobile terminal.

In the embodiments of the disclosure, a mobile terminal sends multimedia stream data to be played to a another-end mobile terminal via a connection established based on NFC technology; the mobile terminal and the another-end mobile terminal decode the multimedia stream data to be played, and respectively play corresponding parts of the decoded multimedia stream data in accordance with their respective part playing modes, the aim of two mobile terminals respectively playing part of a multimedia image can be achieved based on NFC technology, so that the multimedia image can be clearly amplified and displayed via the splicing of mobile terminal screens, thereby helping a user quickly solve the problem that a local mobile terminal screen is small and not good for amplifying and displaying a multimedia image.

In the technical solution provided by the embodiments of the disclosure, a multimedia image is amplified and displayed via the splicing of mobile terminal screens, which is evidently different from the existing method of providing large screens through lattices formed by storage devices to further amplify and display a multimedia image, thus achieving low cost, speediness and convenience, and enhancing user experience of mobile terminals supporting NFC and multimedia playing.

DETAILED DESCRIPTION

NFC technology is a near field high frequency wireless communication technology that allows data communication between terminal devices. With increasing enhancement of mobile terminal functions, the demands from terminal products on data services will grow continuously and rapidly. Several NFC technologies, e.g. Digital Living Network Alliance (DLAN) devices, Bluetooth4.0 (BT4.0), Wireless-Fidelity Direct (Wifi Direct) and NFC, are being integrated and innovated gradually. In the meanwhile, the mutual complement between NFC technology and mobile communication networks such as Long Term Evolution (LTE) and Universal Mobile Telecommunications Systems (UMTS) is also another hotspot of mobile communication development in the future.

To make the purposes, technical solution and advantages of the disclosure clearer, the disclosure will be further described in details below in conjunction with the accompanying drawings and embodiments. It should be understood that the specific embodiments described herein are only used for explaining the disclosure, but not for limiting the disclosure.

In the embodiments of the disclosure, two mobile terminals having screens of the same size establish a connection through NFC technology and transmit multimedia stream data, decode multimedia stream data of a multimedia file, respectively play part of the decoded multimedia stream data, and display a complete video image by the splicing of the screens of the two mobile terminal. Thus it can be seen that, by utilizing the technical solution provided by the embodiments of the disclosure, two mobile terminals having screens of completely the same size can share a multimedia file to be played, and a multimedia image can be displayed and spliced by these two mobile terminals to realize amplification. Therefore, the amplification of a multimedia image is not limited by wired connection any more, which thus helps users to solve the problem that small mobile terminal screens are not good for amplifying and playing a multimedia image and have bad viewing effect.

Figure 1:
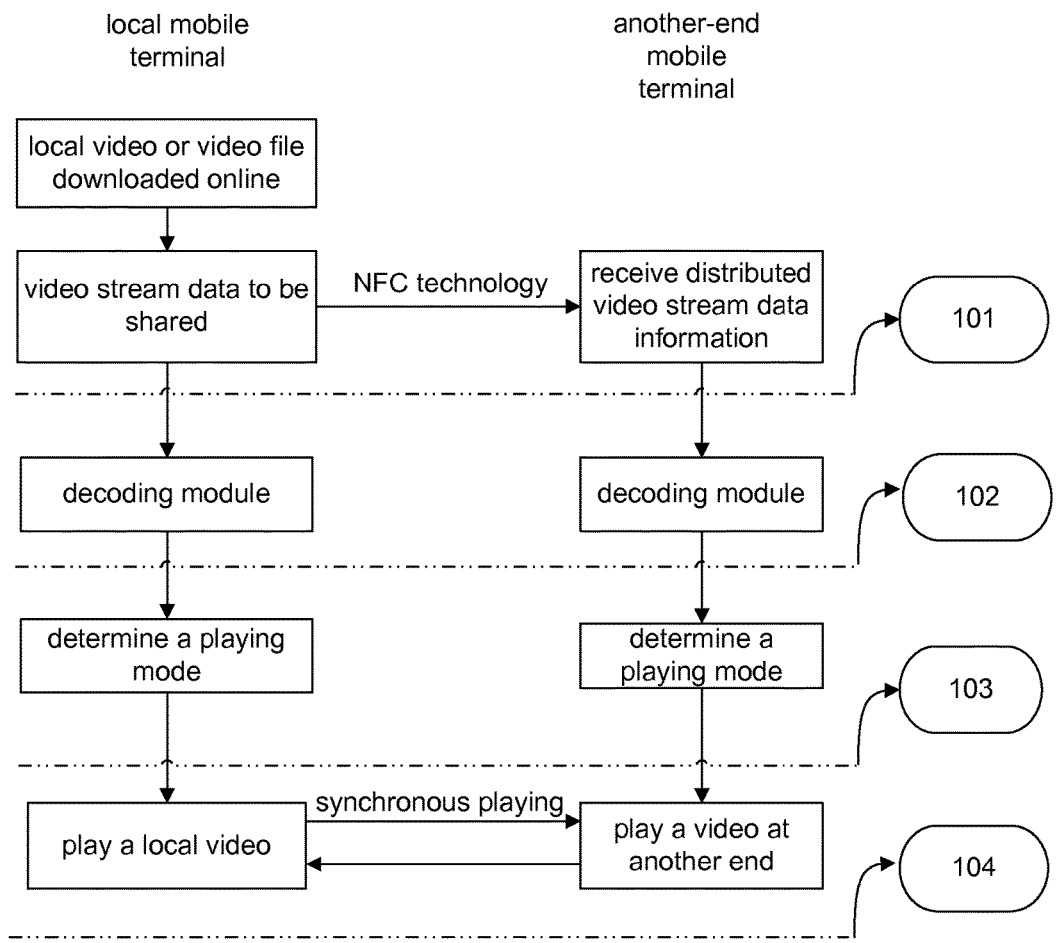
FIG. 1 is a schematic diagram illustrating a processing flow for implementing multimedia playing in an embodiment of the disclosure.
Figure 2:
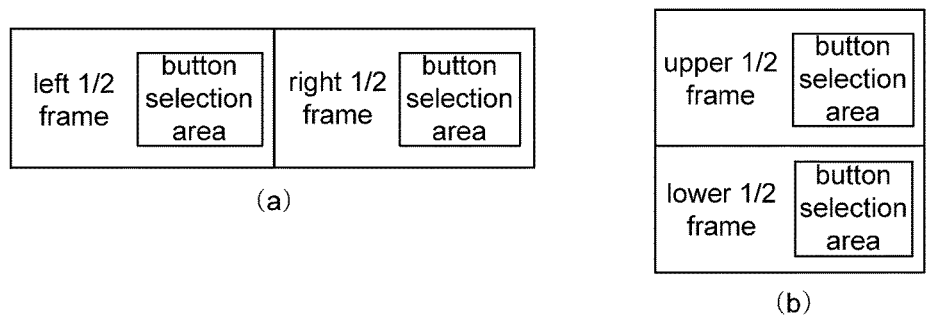
FIG. 2 is a schematic diagram of setting a part playing mode in an embodiment of the disclosure.
Figure 3:
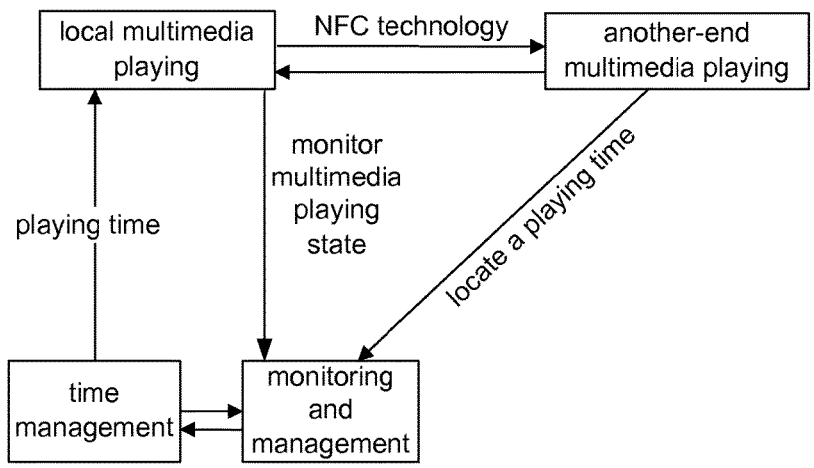
FIG. 3 is a structural diagram of establishing synchronous multimedia playing settings in an embodiment of the disclosure.

An embodiment of the disclosure records an implementation process of a method for splicing multimedia images based on NFC technology. As shown in FIG. 1, the method includes the following steps:

Step 100: a mobile terminal receives input from a user and sets a part playing mode of itself according to the input from the user;

for two mobile terminals, the part playing modes set by the two mobile terminals correspond to each other, i.e. the parts of an video image, which are played respectively by the two mobile terminals, can be spliced together to form a complete video image; for video stream data played on a full screen, the part playing mode generally applied is a half (½) frame mode because the screens of two cooperative mobile terminals have the same size; therefore, the part playing mode may be left ½ frame playing and right ½ frame playing, or the part playing mode may be also upper ½ frame playing and lower ½ frame playing;

if a played video image is viewed horizontally, the part playing mode needs to be set as left ½ frame playing and right ½ frame playing by screen turning and mapping, i.e. the part playing mode of one of the mobile terminals is set as left ½ frame playing while the part playing mode of the other mobile terminal is set as right ½ frame playing; the left ½ frame of the video image and the right ½ frame of the video image can be spliced to form a complete frame of image, thus amplifying the played video image through the splicing of the screens of the mobile terminals;

a user determines the part playing mode of a mobile terminal, i.e. after determining which part of a multimedia image needs to be played by the mobile terminal, then the user input information into the mobile terminal by button selection or options to enable the mobile terminal to set a part playing mode, e.g. as shown in FIG. 2, the user enables the mobile terminal to set the part playing mode as left ½ frame playing or right ½ frame playing (or upper ½ frame playing or lower ½ frame playing) through an operation in a button selection area;

Step 101: a local mobile terminal sends multimedia stream data to be played to another-end mobile terminal via a connection established based on NFC technology to enable the another-end mobile terminal to acquire a multimedia file; the another-end mobile terminal receives the multimedia stream data to be played via the connection established based on NFC technology; thus it can be seen that the local mobile terminal sends the multimedia stream data to the another-end mobile terminal to realize sharing of the multimedia file to be played between the two mobile terminals;

according to different multimedia file sources, the local mobile terminal may send the multimedia stream data by two methods: for a multimedia file that needs to be played locally, the local mobile terminal performs streaming on the local multimedia file and then sends multimedia stream data to the another-end mobile terminal; for a to-be-played multimedia file stored non-locally, e.g. stored on a server side, the local mobile terminal sends, when receiving multimedia stream data, the multimedia stream data directly to the another-end mobile terminal;

wherein the local mobile terminal and the another-end mobile terminal have completely the same screen size; preferably, the local mobile terminal and the another-end mobile terminal may be completely the same in appearance, and may be also completely the same in internal function settings; particularly, it may be defined that the local mobile terminal and the another-end mobile terminal are two mobile terminals with completely the same terminal model;

here, before Step 101, the process may further include a step of establishing a connection between the mobile terminal and the another-end mobile terminal based on NFC technology;

specifically, the user sets a mobile terminal that needs to send multimedia stream data as a data source point and the mobile terminal is a local mobile terminal; the local mobile terminal may turn on a monitoring port to monitor a connection request from another-end mobile terminal; after detecting the connection request from the another-end mobile terminal, the local mobile terminal and the another-end mobile terminal establish a connection through NFC technology; the local mobile terminal may also establish, after finding the another-end mobile terminal through searching a wireless device, a connection with the another-end mobile terminal through NFC technology initiatively;

Step 102: the local mobile terminal and the another-end mobile terminal decode the multimedia stream data to be played;

the decoding means that the local mobile terminal and the another-end mobile terminal separate audio stream data and video stream data from the multimedia stream data to be played and perform audio decoding and video decoding respectively; audio decoding means decoding the audio stream data while video decoding means decoding the video stream data;

the video stream data consists of video frames of which the size is a fundamental unit, and the video frames may be reference frames or may be non-reference frames; in video decoding, reference frames are decoded completely while non-reference frames are decoded partially; specific implementation of decoding in an embodiment of the disclosure will be described in details below in the case that the reference frames include I frames and P frames while the non-reference frames are B frames:

Step 1021: a mobile terminal (a local mobile terminal or another-end mobile terminal) determines the type of current video frames; the specific implementation is the same with that in the prior art and will not be repeated herein;

Step 1022: the mobile terminal acquires extracted video frames according to the type of the video frames, and puts the video frames acquired after the decoding into a video frame sequence cache according to a playing sequence;

specifically, when an I frame is decoded, all macro-blocks in the frame are decoded by using an in-frame prediction algorithm; when a P frame is decoded, all macro-blocks in the frame are decoded by using an in-frame prediction algorithm or an inter-frame prediction algorithm; when a B frame is decoded, the B frame is also formed by macro-blocks as a reference frame, wherein the macro-block is a video element to be decoded, an in-frame prediction algorithm or an inter-frame prediction algorithm may be used at the same time when the B frame is decoded;

specifically, when the B frame is decoded, the locations of all macro-blocks in the B frame may be acquired first according to an inverse scanning method; macro-blocks within the range of a to-be-played video indicated by the part playing mode which is set correspondingly are taken as macro-blocks to be decoded; then macro-blocks, to which the to-be-decoded macro-blocks are dependent, are determined, i.e. depended macro-blocks; if it is determined that the depended macro-blocks are located in reference frames, then information of the depended macro-blocks are extracted directly from the reference frames; when the to-be-decoded macro-blocks are decoded using an in-frame prediction algorithm and if it is determined that the macro-blocks are located in current B frames, the depended frames are decoded first by using the in-frame prediction algorithm, and then the to-be-decoded macro-blocks are decoded; if the depended macro-blocks also depend on other macro-blocks, other macro-blocks are decoded by using the in-frame prediction algorithm first, and the depended macro-blocks are decoded subsequently, and the to-be-decoded macro-blocks are decoded finally; due to the existence of slices, the decoding of the to-be-decoded macro-blocks will be limited to the slices and other slices will not be used, therefore, the decoding time of the to-be-decoded macro-blocks will be less than the decoding time of all macro-blocks in the video frame; a set of relevant macro-blocks is called a slice and macro-blocks among slices are not relevant; the in-frame prediction algorithm of the B frames means that reference frame information received previously needs to be used in decoding of macro-blocks;

the video decoding may be performed according to the H.264 standard which is one of the video coding and decoding technical standards;

Step 103: the local mobile terminal and the another-end mobile terminal respectively play corresponding parts of the decoded multimedia stream data in accordance with the respective part playing mode;

specifically, the mobile terminal (the local mobile terminal or the another-end mobile terminal) extracts the decoded video frames, i.e. the video stream data, from the video frame sequence cache, and crops the completely-decoded video frames into a half frame of video image indicated by the part playing mode set correspondingly, and then amplifies the half frame of video image through mapping and full-screen displaying, and displays the half image of video image on the screen of itself with or without rotation of 90 degrees, i.e. for the left and right ½ frame playing mode, the cropped half frame of video image is directly displayed on the screen of itself; for the upper and lower half playing mode, the cropped half frame of video image is rotated by 90 degrees and then displayed on the screen of itself;

Step 104: in the multimedia playing process, the local mobile terminal and the another-end mobile terminal achieve multimedia playing synchronization according to a synchronization mechanism;

synchronous playing mechanisms mainly include time management and synchronous monitoring and management; when the local mobile terminal achieves the synchronization mechanism, the another-end mobile terminal may, as shown in FIG. 3, send a time label of currently-played multimedia stream data to the local mobile terminal via the connection established through NFC technology; a monitoring and management module in the mobile terminal acquires, after receiving the time label of the multimedia stream data currently played by the another-end mobile terminal, a time label of multimedia stream data currently played by the local mobile terminal, compares the two time labels to determine whether a time difference exists, and if the time difference exists, triggers a time management module in the local mobile terminal to perform playing time calibration on the multimedia stream data played by the local mobile terminal, so as to achieve multimedia playing synchronization between the mobile terminal and the another-end mobile terminal so that the two mobile terminals play a half frame of the same time label respectively;

specifically, if the monitoring and management module determines that the playing time of the two mobile terminals is not synchronous, i.e. the playing time of the local mobile terminal is 0.01 second faster than that of the another-end mobile terminal, then the time management module slows the playing time of the local mobile terminal by 0.01 second;

if the synchronous playing mechanism is realized by the another-end mobile terminal, the specific processing is substantially the same as the description above except that playing time calibration is implemented by the another-end mobile terminal, which will not be repeated here.

Figure 4:
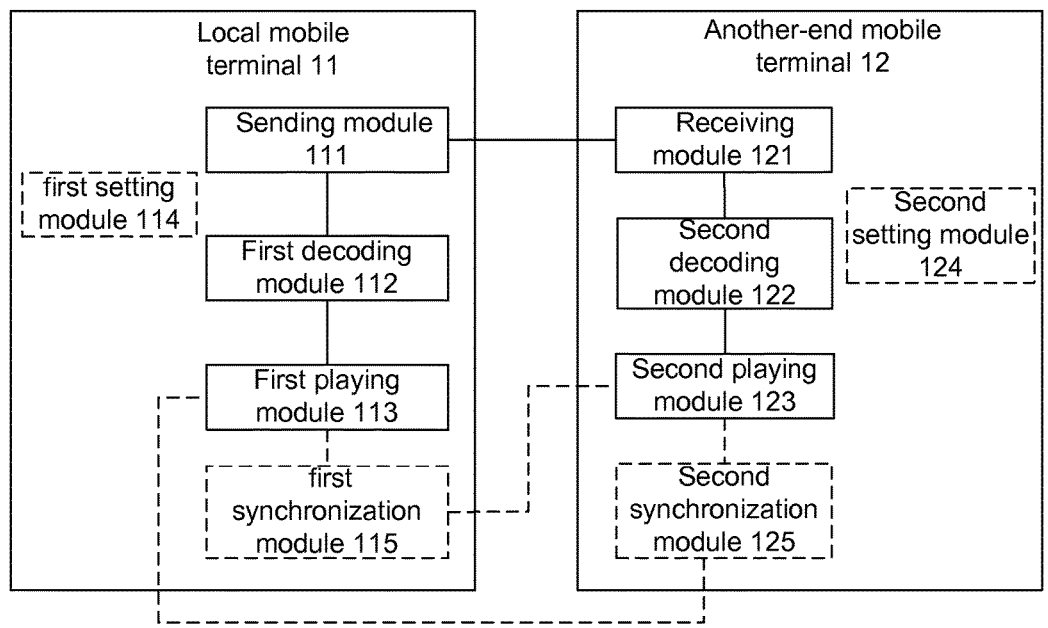
FIG. 4 is a structural diagram illustrating components of a system for implementing multimedia playing in an embodiment of the disclosure.

Another embodiment of the disclosure further provides a system for implementing multimedia playing, applied to mobile terminals supporting NFC technologies (e.g. DLAN, WiFi, NFC or Bluetooth). As shown in FIG. 4, the system includes a local mobile terminal 11 and another-end mobile terminal 12, wherein the local mobile terminal 11 is configured to send multimedia stream data to be played to the another-end mobile terminal 12, decode the multimedia stream data to be played and play a corresponding part of the decoded multimedia stream data in accordance with a part playing mode set by the local mobile terminal;

the another-end mobile terminal 12 is configured to receive multimedia stream data sent by the local mobile terminal 11, decode the received multimedia stream data and play a corresponding part of the decoded multimedia stream data in accordance with a part playing mode set by the another-end mobile terminal.

The local mobile terminal 11 is further configured to set its own part playing mode according to user input;

the another-end mobile terminal 12 is further configured to set its own part playing mode according to user input.

When the local mobile terminal 11 implements a synchronous playing mechanism, the local mobile terminal 11 is further configured to achieve multimedia playing synchronization between itself and the another-end mobile terminal 12 based on a synchronization mechanism, specifically, to receive a time label of multimedia stream data currently played by the another-end mobile terminal 12, to acquire a time label of multimedia stream data currently played by the local mobile terminal 11, to compare the two to determine whether a time difference exists, and to, if the time difference exists, perform playing time calibration on the multimedia stream data played by the mobile terminal 11;

when the another-end mobile terminal 12 implements a synchronous playing mechanism, the another-end mobile terminal 12 is further configured to achieve multimedia playing synchronization between itself and the local mobile terminal 11 based on a synchronization mechanism, specifically, to receive a time label of multimedia stream data currently played by the local mobile terminal 11, to acquire a time label of multimedia stream data currently played by the another-end mobile terminal 12, to compare the two to determine whether a time difference exists, and to, if the time difference exists, perform playing time calibration on the multimedia stream data played by the another-end mobile terminal 12.

Specific processing by the local mobile terminal 11 and the another-end mobile terminal 12 has been described in details in the aforementioned implementation of the method in the embodiment of the disclosure and will not be repeated here.

The local mobile terminal 11 includes a sending module 111, a first decoding module 112 and a first playing module 113, wherein the sending module 111 is configured to sent the multimedia stream data to be played to the another-end mobile terminal 12;

the first decoding module 112 is configured to decode the multimedia stream data to be played;

the first playing module 113 is configured to play a corresponding part of the decoded multimedia stream data in accordance with the set part playing mode.

The local mobile terminal 11 may further include a first setting module 114, configured to set the part playing mode of the local mobile terminal according to user input.

When the local mobile terminal implements the synchronous playing mechanism, the local mobile terminal 11 may further include a first synchronization module 115, configured to achieve multimedia playing synchronization between the local mobile terminal and the another-end mobile terminal based on a synchronization mechanism.

The first synchronization module 115 includes a monitoring and management module and a time management module, wherein the monitoring and management module is configured to receive a time label of multimedia stream data currently played by the another-end mobile terminal, acquire a time label of multimedia stream data currently played by local mobile terminal, compare the two to determine whether a time difference exists, and if the time difference exists, trigger the time management module to perform playing time calibration on the multimedia stream data played by the mobile terminal;

the time management module is configured to perform playing time calibration on the multimedia stream data played by the local mobile terminal.

It needs to be noted that the sending module 111, the first setting module 114 and the first synchronization module 115 of the local mobile terminal 11 may be implemented by a Central Processing Unit (CPU), a Digital Signal Processor (DSP) or a Field Programmable Gate Array (FPGA) and etc. during practical application. The first decoding module 112 may be implemented by a decoder. The first playing module 113 may be implemented by a display screen of a mobile terminal.

The another-end mobile terminal 12 includes a receiving module 121, a second decoding module 122 and a second playing module 123, wherein the receiving module 121 is configured to received the to-be-played multimedia stream data sent by the local mobile terminal;

the second decoding module 122 is configured to decode the multimedia stream data received by the receiving module 121;

the second playing module 123 is configured to play a corresponding part of the decoded multimedia stream data in accordance with a set part playing mode.

The another-end mobile terminal may further include a second setting module 124, configured to set the part playing mode of the another-end mobile terminal 12 according to user input.

When the another-end mobile terminal 12 implements the synchronous playing mechanism, the another-end mobile terminal 12 may further include a second synchronization module 125, configured to achieve multimedia playing synchronization between the another-end mobile terminal and the local mobile terminal based on a synchronization mechanism.

The second synchronization module 125 includes a monitoring and management module and a time management module, wherein the monitoring and management module is configured to receive a time label of multimedia stream data currently played by the local mobile terminal, acquire a time label of multimedia stream data currently played by another-end mobile terminal, compare the two to determine whether a time difference exists, and if the time difference exists, trigger the time management module to perform playing time calibration on the multimedia stream data played by the another-end mobile terminal;

the time management module is configured to perform playing time calibration on the multimedia stream data played by the another-end mobile terminal.

Specific implementation of the first decoding module and the second decoding module corresponds to the Step 102 described in the method in the above embodiment of the disclosure.

Specific implementation of the first playing module and the second playing module corresponds to the Step 103 described in the method in the above embodiment of the disclosure.

It needs to be noted that the receiving module 121, the second setting module 124 and the second synchronization module 125 of the another-end module terminal 12 may be implemented by a CPU, a DSP or an FPGA etc. of a mobile terminal. The second decoding module 122 may be implemented by a decoder of the mobile terminal and the second playing module 124 may be implemented by the display screen of the mobile terminal.

As described above, two mobile terminals can respectively playing part of a multimedia image based on NFC technology by applying the above embodiments, as a result, a multimedia image can be clearly amplified and displayed via the splicing of mobile terminal screens.

What are described above are only embodiments of the disclosure and are not to limit the protection scope of the disclosure.

What is claimed is:

1. A method for implementing multimedia playing, comprising:

sending, by a local mobile terminal, multimedia stream data to be played to another-end mobile terminal via a connection established based on Near Field Communication (NFC) technology;

decoding, by the local mobile terminal and the another-end mobile terminal, the multimedia stream data to be played, and respectively playing corresponding parts of the decoded multimedia stream data in accordance with part playing modes respectively set by the local mobile terminal and the another-end mobile terminal; and achieving, by the local mobile terminal and the another-end mobile terminal, multimedia playing synchronization according to a synchronization mechanism, wherein the achieving, by the local mobile terminal and the another-end mobile terminal, multimedia playing synchronization according to a synchronization mechanism comprises: receiving a time label of multimedia stream data currently played by the another-end mobile terminal, acquiring a time label of multimedia stream data currently played by the local mobile terminal, comparing the two time labels to determine whether a time difference exists, and if the time difference exists, performing playing time calibration on multimedia stream data played by the local mobile terminal according to the time difference; or, receiving a time label of multimedia stream data currently played by the local mobile terminal, acquiring a time label of multimedia stream data currently played by the another-end mobile terminal, comparing the two time labels to determine whether a time difference exists, and if the time difference exists, performing playing time calibration on multimedia stream data played by the another-end mobile terminal according to the time difference.

2. The method according to claim 1, further comprising: before the multimedia stream data to be played is sent, establishing, by the local mobile terminal and the another-end mobile terminal, the connection through the NFC technology.

3. The method according to claim 1, further comprising: before the multimedia stream data to be played is sent, respectively setting, by the local mobile terminal and the another-end mobile terminal, the part playing modes according to user input.

4. The method according to claim 1, wherein the multimedia stream data consists of reference frames and non-reference frames, and the decoding, by the local mobile terminal and the another-end mobile terminal comprises:

decoding reference frames completely; and decoding non-reference frames partially, and wherein the decoding non-reference frames partially, comprises:

decoding, by the local mobile terminal, macro-blocks within a range of a to-be-played by the local mobile terminal according to the part playing modes in reference frames; and decoding, by the another-end mobile terminal, macro-blocks within a range of a to-be-played by the another-end mobile terminal according to the part playing modes in reference frames.

5. A system for implementing multimedia playing, comprising:

a local mobile terminal, configured to send multimedia stream data to be played to a another-end mobile terminal via a connection established based on Near Field Communication (NFC) technology, decode the multimedia stream data to be played and play a corresponding part of the decoded multimedia stream data in accordance with a part playing mode set by the local mobile terminal; and another-end mobile terminal, configured to receive multimedia stream data sent by the local mobile terminal, decode the received multimedia stream data and play a corresponding decoded part of the received multimedia stream data in accordance with a part playing mode set by the another-end mobile terminal;

wherein when the local mobile terminal implements a synchronous playing mechanism, the local mobile terminal is further configured to achieve multimedia playing synchronization with the another-end mobile terminal based on a synchronization mechanism by receiving a time label of multimedia stream data currently played by the another-end mobile terminal, acquiring a time label of multimedia stream data currently played by the local mobile terminal, comparing the two time labels to determine whether a time difference exists, and if the time difference exists, performing playing time calibration on multimedia stream data played by the local mobile terminal according to the time difference; or when the another-end mobile terminal implements a synchronous playing mechanism, the another-end mobile terminal is further configured to achieve multimedia playing synchronization with the local mobile terminal based on a synchronization mechanism by receiving a time label of multimedia stream data currently played by the local mobile terminal, acquiring a time label of multimedia stream data currently played by the another-end mobile terminal, comparing the two time labels to determine whether a time difference exists, and if the time difference exists, performing playing time calibration on multimedia stream data played by the another-end mobile terminal according to the time difference.

6. The system according to claim 5, wherein the local mobile terminal is further configured to set own part playing mode according to user input;

the another-end mobile terminal is further configured to set own part playing mode according to user input.

7. The system according to claim 5, wherein the multimedia stream data consists of reference frames and non-reference frames, the local mobile terminal is further configured to decode reference frames completely and decode non-reference frames partially, wherein decoding, non-reference frames partially, comprises: decoding macro-blocks within a range of a to-be-played by the local mobile terminal according to the part playing modes in reference frames; and the another-end mobile terminal is further configured to decode reference frames completely, and decode non-reference frames partially, wherein decoding non-reference frames partially, comprises: decoding macro-blocks within a range of a to-be-played by the another-end mobile terminal according to the part playing modes in reference frames.

8. A mobile terminal for implementing multimedia playing, comprising:

a decoding module configured to decode multimedia stream data to be played;

a playing module configured to play a corresponding decoded part of the multimedia stream data in accordance with a part playing mode set by the mobile terminal;

a sending module configured to send multimedia stream data to be played to another-end mobile terminal via a connection established based on Near Field Communication (NFC) technology; or a receiving module, configured to receive to-be-played multimedia stream data sent by another-end mobile terminal via a connection established based on Near Field Communication (NFC) technology; and a synchronization module configured to achieve multimedia playing synchronization with the another-end mobile terminal according to a synchronization mechanism, wherein the synchronization module comprises: a monitoring and management module, configured to receive a time label of multimedia stream data currently played by the another mobile terminal, to acquire a time label of multimedia stream data currently played by the mobile terminal, to compare the two time labels to determine whether a time difference exists, and to, if the time difference exists, trigger a time management module to perform playing time calibration on multimedia stream data played by the mobile terminal according to the time difference; the time management module, configured to perform playing time calibration on the multimedia stream data played by the mobile terminal according to the time difference.

9. The mobile terminal according to claim 8, further comprising a setting module, configured to set the part playing mode of the mobile terminal according to user input.

10. The mobile terminal according to claim 8, wherein the decoding module configured to decode reference frames completely and decode non-reference frames partially, wherein decoding non-reference frames partially comprises:

decoding macro-blocks within a range of a to-be-played by the playing module according to the part playing modes in reference frames.

* * * * *